Figure 1:
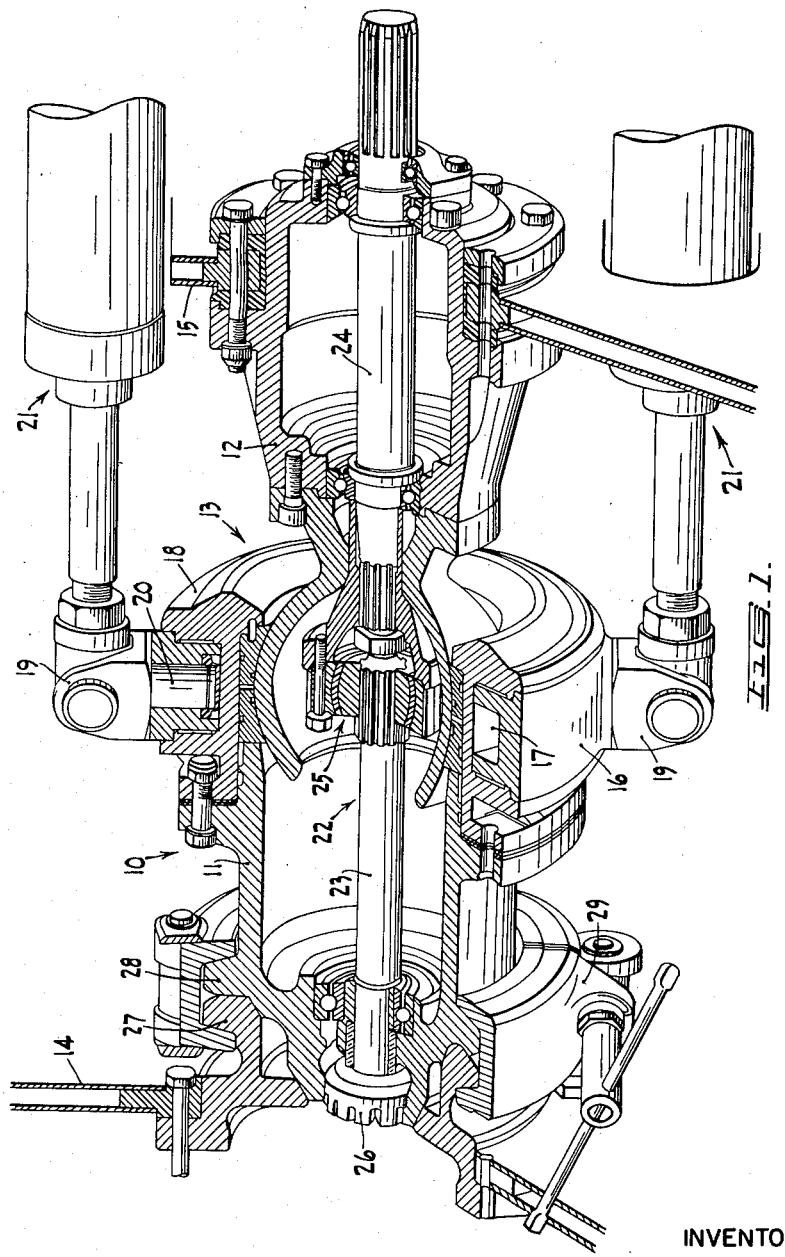

April 5, 1966  I. A. THOMAS  3,244,249
ARTICULATED JOINT ASSEMBLY
Filed Nov. 26, 1963  2 Sheets-Sheet 1

INVENTOR
IAN A. THOMAS

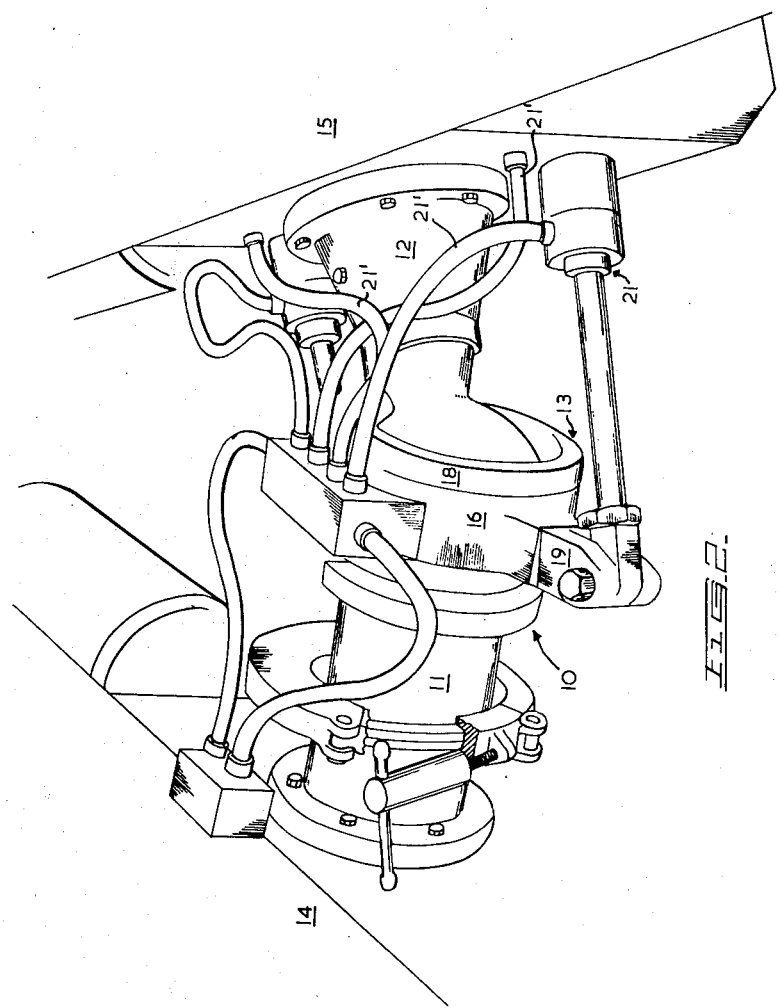

United States Patent Office 3,244,249
Patented Apr. 5, 1966

3,244,249
ARTICULATED JOINT ASSEMBLY
Ian A. Thomas, St. Laurent, Quebec, Canada, assignor to Canadair Limited, Montreal, Quebec, Canada
Filed Nov. 26, 1963, Ser. No. 326,117
Claims priority, application Canada, Nov. 21, 1963, 889,566
8 Claims. (Cl. 180—14)

This invention relates to a coupling for connecting the sections of a vehicle of the tractor-trailer type.

Couplings for articulated vehicles should provide a large degree of freedom in all planes within predetermined limits to permit the two or more sections of the vehicle to assume any attitude relative to each other within the predetermined limits of freedom of the coupling. A very satisfactory form of coupling which has been used in the past is one formed of two parts connected together in end-to-end relationship by a ball and socket joint. Where power is required at the wheels of the tracks of the trailer, the ball and socket coupling has been made in the form of a sleeve to accommodate a transmission shaft concentrically disposed within the sleeve.

A conventional tracked articulated vehicle that steers by speed or force control of either the tractor tracks alone or the speed or force control of the tractor and trailer tracks combined to effect steering imparts shearing forces to the soil beneath the tracks. When the soil is sufficiently overloaded and soil disturbance occurs the inner tracks tend to cause the vehicle to settle lower on the inside, thus imposing under extreme conditions severe mobility limitations. Since the vehicle motion is derived from maintaining the soil-track slip relationship it is obvious that if the steering forces can be removed from the tracks only propulsion forces remain, thus delaying any soil breakdown to impede mobility.

This phenomenon can be observed when a conventional tank steers in very soft soil, the inside track settles lower than the outside track and the vehicle assumes a nose-up attitude as well due to the soil failing along the shear angle of the soil.

Known tractor-trailer combinations have used systems whereby the steering is effected by braking or slowing one track relative to the other thus the steering forces are produced at the track to soil juncture. These same general principles apply to a similar extent for wheeled or half-tracked vehicles.

It has been found that the steering of an articulated vehicle can be improved by mounting the means of reacting the steering forces of the vehicle between the tractor and the trailer so that steering is effected by causing a physical angular displacement of the trailer and the tractor relative to each other. In this way, all the steering forces can be constrained within the vehicle structure itself.

It has been found that the power required for steering, in this manner, is generally less than the more common steering systems found in tracked vehicles, and that the life of tires and tracks is increased by removing the steering forces from them.

It is a further feature of an articulated tracked vehicle in which both sets of tracks are propelled that the tendency of each unit to nose up, if separated, is cancelled out by the trailer lifting the rear of the tractor at the articulation joint.

The ball and socket couplings heretofore employed in articulated vehicles have not been adapted to allow rapid connection and disconnection of the tractor from the trailer. It has been found that this disadvantage can be largely overcome by including a quick disconnect coupling clamp in the coupling at a point apart from the ball and socket connection to permit connection or disconnection without requiring the assembly or disassembly of the ball and socket connection itself.

The improvement in a coupling adapted to couple together two sections of a vehicle of the tractor-trailer type, and including a pivot center intermediate its ends, in accordance with one aspect of the present invention comprises a pair of hydraulic actuators each connected at one end to the trailer and the other end to the coupling at a predetermined point with respect to the pivot center of the coupling and the tractor, said hydraulic actutors being adapted to react the steering forces of the vehicle between the tractor and the trailer to cause angular displacement of the tractor and the trailer relative to each other about the pivot center of the coupling thereby causing the vehicle to proceed in a circular path the radius of which is determined by the extent of said relative angular displacement.

The improvement in a coupling adapted to couple together two sections of a vehicle of the tractor-trailer type in accordance with another aspect of the present invention comprises a sleeve joint having a front portion and a rear portion connected together in end-to-end relationship by a ball and socket joint, the free end of said front portion being adapted for connection to the tractor section and the free end of said rear portion being adapted for connection to the trailer section, and a pair of hydraulic actuators each connected at one end to the front portion of the sleeve joint and at the other end of said trailer, said hydraulic actuators being adapted to react the steering forces of the vehicle between the tractor and the trailer to cause angular displacement of the tractor and the trailer relative to each other about the pivot center of the ball and socket joint thereby causing the vehicle to proceed in a circular path the radius of which is determined by the extent of said relative angular displacement.

In drawings illustrating an embodiment of the invention,

FIGURE 1 is a perspective view of this embodiment with portions cut away to disclose the interior of the coupling, and FIGURE 2 is a perspective view of this embodiment showing the hydraulic feed lines.

The illustrated coupling comprises a sleeve joint 10 having a front portion 11 and a rear portion 12 connected together in end-to-end relationship by a ball and socket joint 13. The free end of the front portion 11 is connected to the hull of the tractor 14 and the free end of the rear portion 12 is connected to the hull of the trailer 15. The relative center of rotation of the ball and socket joint 13 is hereinafter referred to as the pivot center of the coupling.

A yoke ring 16 centered with the pivot center of the coupling, is disposed in a deep groove 17 in the ball joint housing 18 and is rotatable through 360°. A pair of diametrically opposed mounting lugs 19, rotatable about coaxial shafts 20 (only one of which is shown in the drawing), are mounted on the opposite sides of the yoke ring 16. The longitudinal axes of the co-axial shafts 20 are perpendicular to the longitudinal axis of the front portion 11 of the sleeve joint 10.

A pair of hydraulic actuators 21, disposed substantially in horizontal alignment, are each pivotally connected at one end to one of the lugs 19 and at the other end to the trailer 15. A plurality of hydraulic feed lines 21' communicates with the actuators 21 to steer the vehicle. By reacting the vehicle steering forces at a point between the trailer and the tractor, steering is effected by causing an angular displacement of the tractor 14 and trailer 15 relative to each other about the pivot center of the coupling resulting in the combined vehicle following a circular path, the radius of which is determined by the extent of the angular displacement.

To provide power at the wheels or tracks of the trailer, a transmission shaft 22 is concentrically disposed within the sleeve and includes the two parts 23 and 24 connected together in end-to-end relationship by the constant velocity universal joint 25 which is centered in the ball and socket joint 13. The transmission shaft 22 is adapted to transmit power from the tractor to the trailer. Power can be transmitted through the coupling by other than mechanical means. For instance, hydraulic power transmitted through pipes could be utilized or electrical power transmitted through cables, or even possibly, combinations of all three.

To permit the trailer 15 to be quickly disconnected from or connected to the tractor 14 the transmission shaft includes a spring loaded dog clutch 26 at the forward end thereof adapted to quickly engage and disengage the main transmission shaft of the tractor 14 and the front portion 11 of the coupling 10 is formed of two parts 27 and 28 joined at a point intermediate the ball and socket joint 13 and the tractor 14 by a quick disconnect coupling clamp 29. Loosening and removing the clamp 29, separates the parts 27 and 28 of the front portion 11 of the coupling 10 thereby separating the trailer from the tractor. When the parts 27 and 28 are separated the spring loaded dog clutch 26 is disengaged from the main transmission shaft of the tractor. Thus it is not necessary to reverse the conventional steps of assembling the coupling 10 by removing several bolts and disconnecting part of the socket of the joint 13 in order to disconnect the trailer from the tractor. A manually or mechanically engageable dog clutch could be employed rather than the spring loaded dog clutch described.

The ball and socket type of coupling permits free angular movement of the trailer relative to the tractor within the predetermined limits set by the design of the ball and of the socket. The trailers are thereby adapted to readily conform to changes in the direction of the tractor and all sections of the vehicle are free to adapt themselves to irregularities of the ground over which the vehicle travels.

I claim:
1. In a coupling adapted to couple together two sections of an articulated vehicle which includes first and second vehicle sections arranged in tandem, the improvement of a sleeve joint having a front portion and a rear portion connected together in end-to-end relationship by a ball and socket joint with the latter defining the pivot centre of said sleeve joint, the free end of the front sleeve portion being adapted for connection to the first section of the vehicle, and the free end of the rear sleeve portion being adapted for connection to the second section of the vehicle, and a yoke ring rotatably connected to said front sleeve portion thereby permitting rotation of the ring about the axis of the front sleeve portion, a pair of hydraulic actuators each connected at one end to said rotatably mounted yoke ring and adapted to be connected at the other end to said second section of the vehicle, said hydraulic actuators exerting a vehicle steering force extending from the second vehicle section through said rotatable yoke ring to the front portion of said sleeve joint, thereby to cause angular displacement of the first and second vehicle sections relative to each other about the pivot centre of the sleeve joint and thereby causing the articulated vehicle to proceed in a circular path with the radius of said path being determined by the extent of said relative angular displacement.

2. A coupling according to claim 1 wherein said yoke ring is centered with the pivot centre of said sleeve joint.

3. In a coupling adapted to couple together two sections of a vehicle of the tractor-trailer type, the improvement of a sleeve joint having a front sleeve portion and a rear sleeve portion connected together in end-to-end relationship by a ball and socket joint the latter defining a pivot centre, the free end of said front sleeve portion being adapted for connection to the tractor section and the free end of said rear sleeve portion being adapted for connection to the trailer section, a transmission shaft disposed within the sleeve joint and including a universal joint centered with the ball and socket joint, said transmission shaft serving to transmit power from said tractor to said trailer, a yoke ring rotatably connected to the front portion of the sleeve joint, a pair of hydraulic actuators each connected at one end to said yoke ring and adapted to be connected at the other end to said trailer, said hydraulic actuators exerting a steering force extending from the trailer through said yoke ring to the front portion of the sleeve joint thereby to cause angular displacement of the tractor and the trailer relative to each other about said pivot center of the ball and socket joint thereby causing the vehicle to proceed in a circular path the radius of which is determined by the extent of said relative angular displacement.

4. In a coupling adapted to couple together two sections of a vehicle of the tractor-trailer type, the improvement of a sleeve joint having a front portion and a rear portion connected together in end-to-end relationship by a ball and socket joint, the free end of said front portion being adapted for connection to the tractor section and the free end of said rear portion being adapted for connection to the trailer section, a transmission shaft concentrically disposed within the sleeve joint, said transmission shaft comprising two parts connected together in end-to-end relationship by a constant velocity, universal joint centered with the ball and socket joint, said transmission shaft serving to transmit power from said tractor to said trailer, a yoke ring connected to the front portion of the sleeve joint and rotatable through 360°, a pair of hydraulic actuators, disposed substantially in horizontal alignment, each of the actuators pivotally connected at the one end to said yoke ring and adapted to be connected at the other end to said trailer, said hydraulic actuators being adapted to determine the direction of said vehicle by reacting the vehicle steering forces between the yoke ring and the trailer to cause angular displacement of the tractor and the trailer relative to each other about the pivot center of the ball and socket joint thereby causing the vehicle to proceed in a circular path the radius of which is determined by the extent of said relative angular displacement.

5. A coupling according to claim 3 including a coupling clamp in said front portion of said sleeve joint intermediate the end thereof connected to the tractor and the yoke ring, and adapted to be quickly unclamped to disconnect said trailer from said tractor.

6. A coupling according to claim 3 in which the front portion of the sleeve joint is formed of two parts detachably connected together in end-to-end relationship by a clamp and in which the transmission shaft includes a dog clutch attached to the tractor end thereof, said dog clutch and said clamp being adapted to enable said trailer to be quickly disconnected from said tractor.

7. A coupling according to claim 3 in which the front portion of the sleeve joint is formed of two parts detachably connected together intermediate the tractor end thereof and the yoke ring by a clamp, and in which the transmission shaft includes a spring loaded dog clutch attached to the tractor end thereof, whereby said clamp readily permits the tractor and the trailer to be disconnected and the dog clutch serves to quickly disengage the transmission shaft of the coupling from the transmission shaft of the tractor when the trailer is disconnected from the tractor.

8. A coupling according to claim 3 in which the yoke ring is centered with the pivot center of the coupling.

References Cited by the Examiner

UNITED STATES PATENTS

| | | | |
|---|---|---|---|
| 1,965,985 | 7/1934 | Morgan | 180—14 |
| 2,883,774 | 4/1959 | Clifford | 180—50 X |
| 2,933,143 | 4/1960 | Robinson et al. | 180—14 |
| 3,035,654 | 5/1962 | Nuttall et al. | 180—14 |

BENJAMIN HERSH, *Primary Examiner.*

R. C. PODWIL, C. C. PARSONS,
*Assistant Examiners.*